United States Patent [19]

Harmuth

[11] Patent Number: 5,159,343
[45] Date of Patent: Oct. 27, 1992

[54] RANGE INFORMATION FROM SIGNAL DISTORTIONS

[75] Inventor: Henning F. Harmuth, Potomac, Md.

[73] Assignee: Geophysical Survey Systems, Inc., North Salem, N.H.

[21] Appl. No.: 654,899

[22] Filed: Feb. 13, 1991

Related U.S. Application Data

[63] Continuation-in-part of Ser. No. 499,014, Mar. 26, 1990.

[51] Int. Cl.⁵ .............................................. G01S 13/08
[52] U.S. Cl. ..................................... 342/22; 342/145
[58] Field of Search ............... 342/22, 123, 124, 145, 342/189, 191, 192, 193, 195, 118

[56] References Cited

U.S. PATENT DOCUMENTS

| | | | |
|---|---|---|---|
| Re. 31,509 | 1/1984 | Neidell | 342/378 |
| 3,665,466 | 5/1972 | Hibbard | 342/59 |
| 3,806,795 | 4/1974 | Morey | 342/22 X |
| 3,900,878 | 8/1975 | Tsao | 342/459 |
| 3,906,213 | 9/1975 | Meriaux et al. | 364/569 |
| 3,967,282 | 6/1976 | Young et al. | 342/22 |
| 4,114,153 | 9/1978 | Neidell | 342/108 |
| 4,161,731 | 7/1979 | Barr | 342/22 |
| 4,282,589 | 8/1981 | Evetts et al. | 367/90 |
| 4,293,945 | 10/1981 | Atia et al. | 370/17 |
| 4,430,653 | 2/1984 | Coon et al. | 342/22 |
| 4,675,595 | 6/1987 | Hane | 342/22 X |
| 4,688,185 | 8/1987 | Magenheim et al. | 364/563 |
| 4,698,634 | 10/1987 | Alongi et al. | 342/22 |
| 4,717,252 | 1/1988 | Halldorsson et al. | 342/22 X |
| 4,721,961 | 1/1988 | Busignies et al. | 342/458 |
| 4,812,850 | 3/1989 | Gunton et al. | 342/22 |
| 4,839,654 | 6/1989 | Ito et al. | 342/22 |
| 4,896,116 | 1/1990 | Nagashima et al. | 342/22 X |
| 4,951,055 | 8/1990 | Katayama | 342/22 |
| 5,012,248 | 4/1991 | Munro et al. | 342/22 |

Primary Examiner—John B. Sotomayor
Attorney, Agent, or Firm—Wolf, Greenfield & Sacks

[57] ABSTRACT

An electromagnetic signal having originally the time variation of a rectangular pulse is radiated into a lossy medium with conductivity $\sigma$. It is distorted by the medium to the distorted electromagnetic pulse $f(\sigma,y,t)$ when it travels the distance $y/2$, in time $t/2$, from a transmitter to a scattering or reflecting target and the same distance $y/2$, in time $t/2$, back to the receiver. The time variation $f(\sigma,y,t)$ of the distorted pulse can be calculated for any conductivity $\sigma$ and distance $y$ using the conductivity $\sigma$ known from previous measurements to determine the range to the target distorted pulse $f(\sigma,y,t)$. Consequently, distorted pulses $f(\sigma,y_n,t)$ can be computed and compared to the received distorted pulse $f(\sigma,y,t)$. The computed pulse $f(\sigma,y_n, t)$ that is most similar to the received pulse $f(\sigma,y,t)$ determines the distance $y_n/2$ to the scattering or reflecting object, which is the range to the target. The comparison between the computed, distorted signals and the actually received signal can be done by cross-correlation. If cross-correlation is used, the peak amplitude or the energy of the received signal becomes unimportant which means the physical size or radar cross-section of the target has no effect on the distance determination.

12 Claims, 4 Drawing Sheets

PROPAGATION MEDIUM
$\sigma \epsilon \mu$ 5,159,343

RANGE INFORMATION FROM SIGNAL DISTORTIONS

CROSS REFERENCE TO RELATED APPLICATION

This application is a continuation-in-part of application Ser. No. 07/499,014 filed Mar. 26, 1990.

FIELD OF THE INVENTION

This invention relates to the determination of range information when a radar signal propagates through a lossy medium which introduces substantial signal distortion.

BACKGROUND OF THE INVENTION

A conventional radar determines the range to a target by measuring the round trip time of the returned radar signal. This method of determining the range is typically implemented by detecting the arrival time of the leading edge of the returned signal. The implementation works well as long as the transmission medium produces little or no distortion to the leading edge of the signal. Media such as the atmosphere, empty space, dry ground, solid rock and ice fall into this class of media. However, when the transmission medium contains water, molten rock or hot rock such large signal distortions are produced by the medium that the exact arrival time of the leading edge cannot be determined. Hence, the standard technique for measuring range becomes too inaccurate to be effective. Water with low mineral content and molten rock are examples of media that produce such large signal distortions that the standard method fails. But, in all these cases, range information can be derived by a new method, disclosed herein, that actually makes use of the distortions of the returned signal to determine range.

Determining the range of a scattering or reflecting object by measuring the round-trip time of the leading edge of the radar signal has been known and used throughout the history of radar. The round-trip time $\Delta T$ of an electromagnetic signal returned by a scattering or reflecting object is observed, and the range $d = c\Delta T/2$ is derived from the velocity of light $c = 1/\sqrt{\epsilon\mu}$, where $\epsilon$ and $\mu$ are the permittivity and the permeability of the medium. This approach works as long as the conductivity $\sigma$ of the medium can be ignored, which is the case in the atmosphere, vacuum, dry soil and rock. However, if significant amounts of water are present or if electromagnetic signals are used to probe hot or molten rock, the conductivity $\sigma$ can no longer be ignored. This means that a) the propagation velocity of a radar signal no longer defined by $c = 1/\sqrt{\epsilon\mu}$, and b) signals transmitted through such a medium are significantly distorted. The exact arrival time of a pulse that has been distorted so that its leading edge is no longer sharp, is dependent upon the detection level (i.e., threshold level) Hence, the precise round trip time $\Delta T$ is difficult to determine. Therefore, range determination by means of the conventional radar principle is no longer feasible.

In order to overcome this difficulty, the propagation of electromagnetic signals in lossy media was studied. This study ran into an unexpected obstacle of great significance. Maxwell's equations, which are the basis for all electromagnetic wave transmission, were found to fail for the propagation of pulses or "transients" in lossy media. Upon investigation, the reason turned out to be the lack of a magnetic current density term analogous to the electric current density term. It is understood that currents are carried by both charges and dipoles and higher order multipoles. For instance, the current in a resistor is carried by charges or monopoles. But, the electric "polarization" current flowing through the dielectric of a capacitor is carried by electric dipoles. A magnetic current density term does not occur in Maxwell's equations because magnetic charges equivalent to negative electric charges (e.g., electrons, negative ions). or equivalent to positive electric charges (e.g. positrons, protons, positive ions) have never been reliably observed. Nevertheless, since magnetic dipoles are known to exist (e.g., the magnetic compass needle), there must be magnetic polarization currents carried by these dipoles. This fact calls for a magnetic current density term in Maxwell's equations.

The modification of Maxwell's equations and the transient solutions derived from the modified equations are discussed in H. F. Harmuth, *Propagation of Nonsinusoidal Electromagnetic Waves*, Academic Press, New York 1986, which is hereby incorporated by reference. Using these solutions, the propagation and distortion of electromagnetic signals was further studied in the PhD thesis "Propagation Velocity of Electromagnetic Signals in Lossy Media in the Presence of Noise", by R. N. Boules, Department of Electrical Engineering, The Catholic University of America, Washington D.C., 1989. This thesis contains computer plots of distorted signals having propagated over various distances in lossy media with a conductivity $\sigma$. In particular, the case $\sigma = 4S/m$, relative permittivity 80, and relative permeability 1 (i.e., typical values for sea water) is treated in some detail.

SUMMARY OF THE INVENTION

According to the invention, a rectangular pulse $f(t_o)$ is transmitted as an electromagnetic signal into a medium with conductivity $\sigma$. It is distorted by the medium into the distorted electromagnetic pulse $f(\sigma,y,t)$, after traveling the distance $y/2$ in time $t/2$ from the transmitter to a scattering or reflecting object and the same distance $y/2$ in time $t/2$ back to the receiver. The shape of the distorted pulse can be calculated for any conductivity $\sigma$ and distance d using the conductivity from previous measurements, such as 4S/m for sea water, and the return, distorted pulse $f(\sigma,y,t)$ can be compared to a plurality of computed distorted signals $g(y_n) = f(\sigma,y_n,t)$, where $n = 0, 1, 2 \ldots$ The computed signal $g(y_n)$ that is most similar to the actually received signal $f(\sigma,y,t)$ is the best match. This best match indicates the range to the target by directly determining the distance y to the scattering or reflecting object.

Alternately, the arrival time of the returned pulse $f(\sigma,y,t)$, can be accurately determined by comparing it against computed distorted signals $g(t_n) = f(\sigma,\tau_n,t)$ until a match is made. The distorted signal $g(t_n) = f(\sigma,\tau_n,t)$ is computed in the receiver at various time intervals until the received signal $f(\sigma,y,t)$ matches $g(t_n)$.

The comparison between the computed, distorted signals and the actually received signal can be done in four different ways depending upon two choices. First, it can be done in either real time or off-line. Second, it can be done in hardware or software.

If cross-correlation is used for detection, the peak amplitude or the energy of the received signal becomes unimportant. This means the radar cross-section of the scattering or reflecting object becomes unimportant.

The invention will be better understood from the detailed description below, which should be read in conjunction with the accompanying drawing.

DETAILED DESCRIPTION

Figure 1:
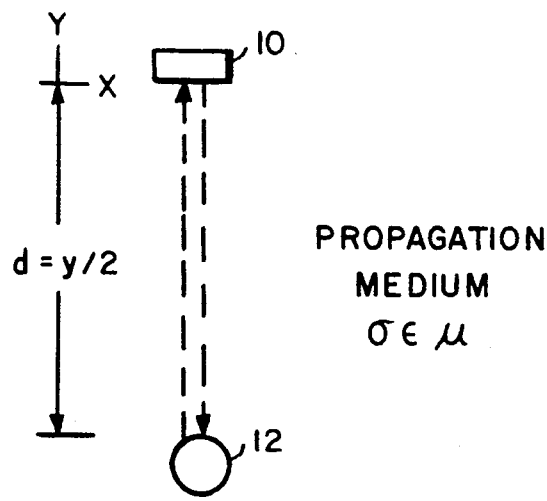
FIG. 1 diagrammatically illustrates a probing radar sending pulses to a reflecting object and receiving the reflected signal through a medium of permittivity $\epsilon$, permeability $\mu$ and conductivity $\sigma$.

FIG. 1 shows a probing radar 10 that radiates an electromagnetic pulse down to a scattering object 12 at a distance d, and receives a returned signal that has traveled the distance 2d in the time $\Delta T=2d/c$. If the propagation velocity c of the pulse is known, one can obtain the distance d from a measurement of the round-trip propagation time $\Delta T$. This is the well known principle of range determination commonly used in radar equipment today. The expression "probing radar" is used here to emphasize that the radar looks down into the ground or into water. Accordingly, the remaining figures and equations use "y" rather than "2d" to designate the distance traveled along the y axis.

Figure 2:
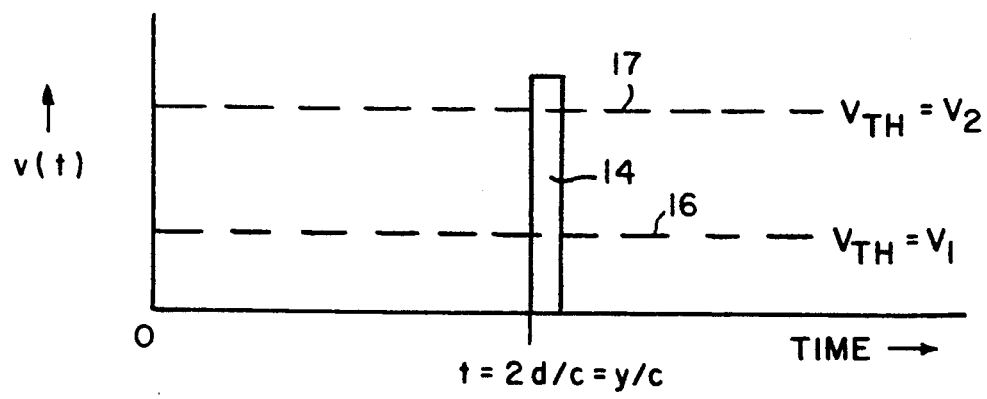
FIG. 2 is the time diagram of an undistorted returned pulse received by the transceiver of FIG. 1.

The measurement of the round trip time $\Delta T$ is shown in more detail in FIG. 2. FIG. 2 indicates what is observed on the cathode ray tube associated with the radar receiver. The returned pulse 14 is shown to begin at the time $t_r=2d=y/c$. The duration of the pulse is not important for the measurement. But its arrival time is, because the time between the arrival time and the transmission time is the round trip time $t_r$. The arrival time is determined, and the pulse is said to be detected, when the leading edge of the returned pulse crosses a predetermined threshold $V_{TH}$. The distance is then computed to be $d=ct_r/2$. As can be seen from FIG. 2, the computed distance depends very little, or not at all, on whether threshold voltage 16, $V_{TH}=V_1$, or threshold voltage 17, $V_{TH}=V_2$, is used because the leading edge of the returned pulse rises sharply. The leading edge will be sharp if the returned pulse experiences little or no distortion during its travel. This is the condition which is typically satisfied for pulses that propagate through a non-distorting or slightly distorting medium like the atmosphere.

In terms of Maxwell's equations, range determination by threshold detection of the returned pulse works if the medium's conductivity $\sigma$ equals zero and its permeability $\mu$ as well as its permittivity $\epsilon$ are scalar constants. No signal distortions occur due to the medium in this case since there are no losses. The propagation velocity c of the pulse is given by $c=1/\sqrt{\epsilon\mu}$.

The method of range determination, by means of detecting when the leading edge of a pulse crosses a threshold, breaks down for media with a significant conductivity. Such media are typically mixtures of minerals and water, ranging from soil with some water content, to water with some mineral content. A second typical medium consists of either hot or molten rock. The mechanism causing a significant conductivity is different in these two examples, but the value of the conductivity $\sigma$ is the key, not the mechanism that causes it.

Figure 3:
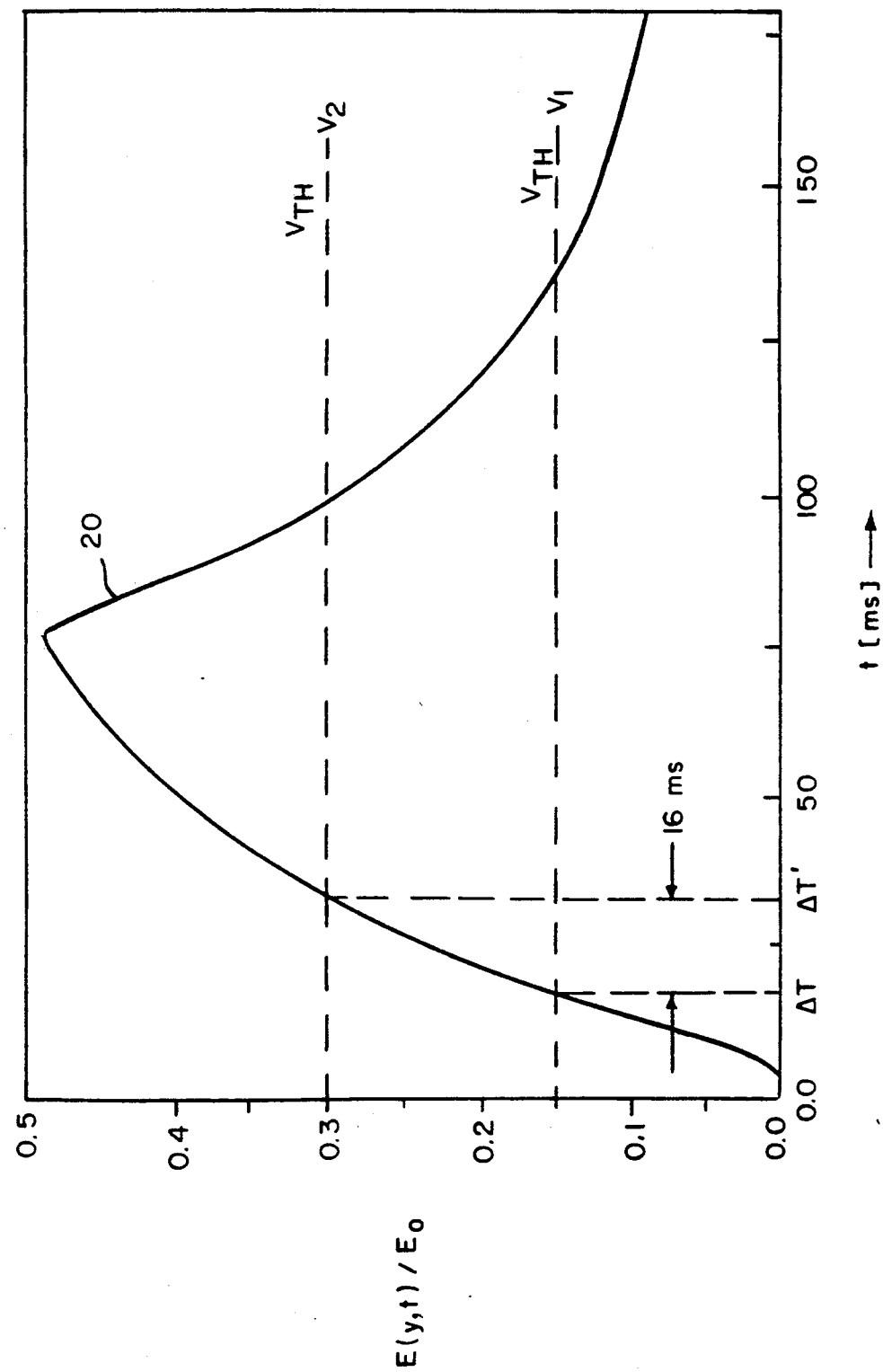
FIG. 3 shows the time variation of the electric field strength $E(y,t)/E_O$ of an originally rectangular pulse of duration 71.4 ms and amplitude $E_O$ after having propagated 1.1 km through a medium with conductivity 4S/m, relative permittivity $\epsilon/\epsilon_O=80$, and relative permeability $\mu/\mu_O=1$, where $\epsilon_O$ and $\mu_O$ are the permittivity and permeability of free space, respectively.

FIG. 3 shows waveform 20, which is the time variation of the electric field strength $E(y,t)/E_O$ of an originally rectangular pulse of duration 71.4 ms and amplitude $E_O$, after propagating the distance $y=1.1$ km through a medium with conductivity $\sigma=4S/m$, relative permittivity $\epsilon_r=\epsilon/\epsilon_O=80$, and relative permeability $\mu_r=\mu/\mu_O=1$, where $\epsilon_O$ and $\mu_O$ are the permittivity and permeability of free space, respectively. These values of $\sigma$, $\epsilon_r$, and $\mu_r$ are typical for either water with a content of 4% NaCl or certain types of molten rock. It is evident that the choice of threshold voltage 22, $V_{TH}=V_1$, versus threshold voltage 23, $V_{TH}=V_2$, strongly affects the time of detection $t_r$ and thus the observed range of an object. This illustration is based on FIGS. 6-10 of the previously mentioned PhD thesis of R. N. Boules, which is hereby incorporated by reference. FIG. 3 indicates that the arrival time measurement will differ by 16 ms if the threshold voltage is set at level 23 rather than level 22. If the propagation velocity is computed for the above example, from the formula $c=1/\sqrt{\mu_r}$, then $c=33541$ km/s, and consequently the time difference of 16 ms becomes a distance difference of 268 km. This represents a large uncertainty in the range measurement. So, determining the range by a threshold based measurement of the arrival time of the leading edge of this pulse is clearly not feasible There is still a second effect that works against range determination via the threshold method. If the waveform of FIG. 3 is detected at the threshold voltage 22, then only the energy of the pulse received before the leading edge crosses $V_1$ is used. However, it is evident by inspection that almost all the energy of the pulse occurs after the leading edge reaches $V_1$. Hence, very poor use is made of the signal energy. Shorter pulses are not a feasible solution. In a medium with losses caused by the conductivity $\sigma$, it is better to use long pulses, since long pulses lose less due to absorption than do short pulses.

It is apparent that a new principle is required to derive range information in lossy media. Such a new principle is taught herein. The principle involves comparing computed values of the returned signal against actually received signals. The computed signals can be determined by varying either the distance (y) or the time (t) traveled by the signal. Either variable can be changed to get a plurality of distorted waveforms, each representing a different distance or time in the lossy medium, to compare against the actually received signal.

Given certain values of conductivity $\sigma$, permittivity $\epsilon$, and permeability $\mu$, the time variation of the electric field strength $E(y,t)/E_O$ is a function of the propagation distance y. The electric field strength $E(y_n,t)$, of an originally rectangular pulse with amplitude $E_O$ and duration T that has propagated the distance $y_n$ can be calculated for n=1, 2, ... Alternatively, the time variation of the electric field strength as a function of a nominal propagation time $\tau_n$ is $E(\tau_n,t)$ for n=1, 2 ... So, the normalized function, produced by an originally rectangular pulse with amplitude $E_O$ and duration T that has propagated the nominal time $\tau_n$, is $E(\tau_n,t)/E_O$.

It is apparent that either the propagation time, $\tau_n$, or the propagation distance, $y_n$, can be used to determine the range d. However, the distance $y_n$ is unique whereas the propagation time is a matter of definition. Hence, $\tau_n$ is referred to as the "nominal" time, to provide a bridge to the usual time measurement in radar, but it must not be used to replace the very real and unique concept of distance.

If an electric field strength $E(y,t)$ is received from a target at the unknown distance y, it can be compared with computed field strengths $E(y_n,t)$. The propagated distance y will be closest to a particular distance $y_n$ of the calculated field strengths $E(y_n,t)$ for the value of n=n' which minimizes the mean square difference.

$$\int_o^\infty [E(y,t) - E(y_n,t)]^2 \, dt = \text{min!} \tag{1a}$$

Thus, the distance y, which is approximately equal to $y_n$ can be obtained by comparing the actually received field strength $E(y,t)$ with sample field strengths that are computed for different values of $y_n$.

The limits O and $\infty$ in Eq.(1a) require some explanation. The lower limit O denotes the time at which the pulse starts to arrive from the shortest distance of interest. The upper limit, $\infty$, denotes the time when the end of the pulse would arrive from the longest distance of interest.

Thinking in terms of the unknown nominal propagation time $\tau$ rather than the unknown distance y requires that the received electric field strength $E(\tau,t)$ be compared with computed field strengths $E(\tau_n,t)$. Thus, the nominal round-trip propagation time $\tau$ will be closest to a particular time $\tau_n$ of the calculated field strengths $E(\tau_n,t)$ for the value of n=n' which minimizes the mean square difference.

$$\int_o^\infty [E(\tau,t) - E(\tau_n,t)]^2 \, dt = \text{min!} \tag{1b}$$

Thus, the nominal time $\tau$ is approximately equal to $\tau_n$ which is obtained by comparison of the actually received field strength $E(\tau,t)$ with sample field strengths computed for different values of $\tau_n$.

Equations 1a and 1b can be rewritten as 2a and 2b, respectively:

$$\int_o^\infty E^2(y,t)dt + \int_o^\infty E^2(y_n,t)dt - \tag{2a}$$

$$2\int_o^\infty E(y,t)E(y_n,t)dt = \text{min!}$$

$$\int_o^\infty E^2(\tau,t)dt + \int_o^\infty E^2(\tau_n,t)dt - \tag{2b}$$

$$2\int_o^\infty E(\tau,t)E(\tau_n,t)dt = \text{min!}$$

The two equations differ in the notation only and their physical content is thus the same. For tutorial reasons, Eq. (2b) is carried for two more steps since radar designers often prefer to think in terms of a nominal propagation time rather than distance.

The first integral in either equation has the same value for any n and thus does not contribute to the decision of which n in Eq. 2a and Eq. 2b yields a minimum. We may leave out this term, divide by 2 and rewrite the remainder of Equations 2a and 2b as Equations (3a) and (3b), respectively:

$$\int_o^\infty E(y,t)E(y_n,t)dt - 0.5\int_o^\infty E^2(y_n,t)dt = \text{max!} \tag{3a}$$

$$\int_o^\infty E(\tau,t)E(\tau_n,t)dt - 0.5\int_o^\infty E^2(\tau_n,t)dt = \text{max!} \tag{3b}$$

The first integral is the cross correlation of the received field strengths $E(y,t)$ or $E(\tau,t)$ with the respective sample function $E(y_n,t)$ or $E(\tau_n,t)$ The cross-correlation functions for correlation in nominal propagation time and distance are given below as Equations 4a and 4b.

$$\int_o^\infty E(y,t-t')E(y_n,t)dt \tag{4a}$$

$$\int_o^\infty E(\tau,t-t')E(\tau_n,t)dt \tag{4b}$$

Equations 4a and 4b reduce to the first integral in Equations 3a and 3b, respectively, for the case where t'=0. These terms will be a maximum when the largest peak of the auto-correlation function for $y=y_n$ or $\tau=\tau_n$ occurs.

The second integral in equations 4a and 4b can be obtained by computation for any desired distance $y_n$ traveled through the medium, or nominal round-trip propagation time $\tau_n$.

Figure 4:
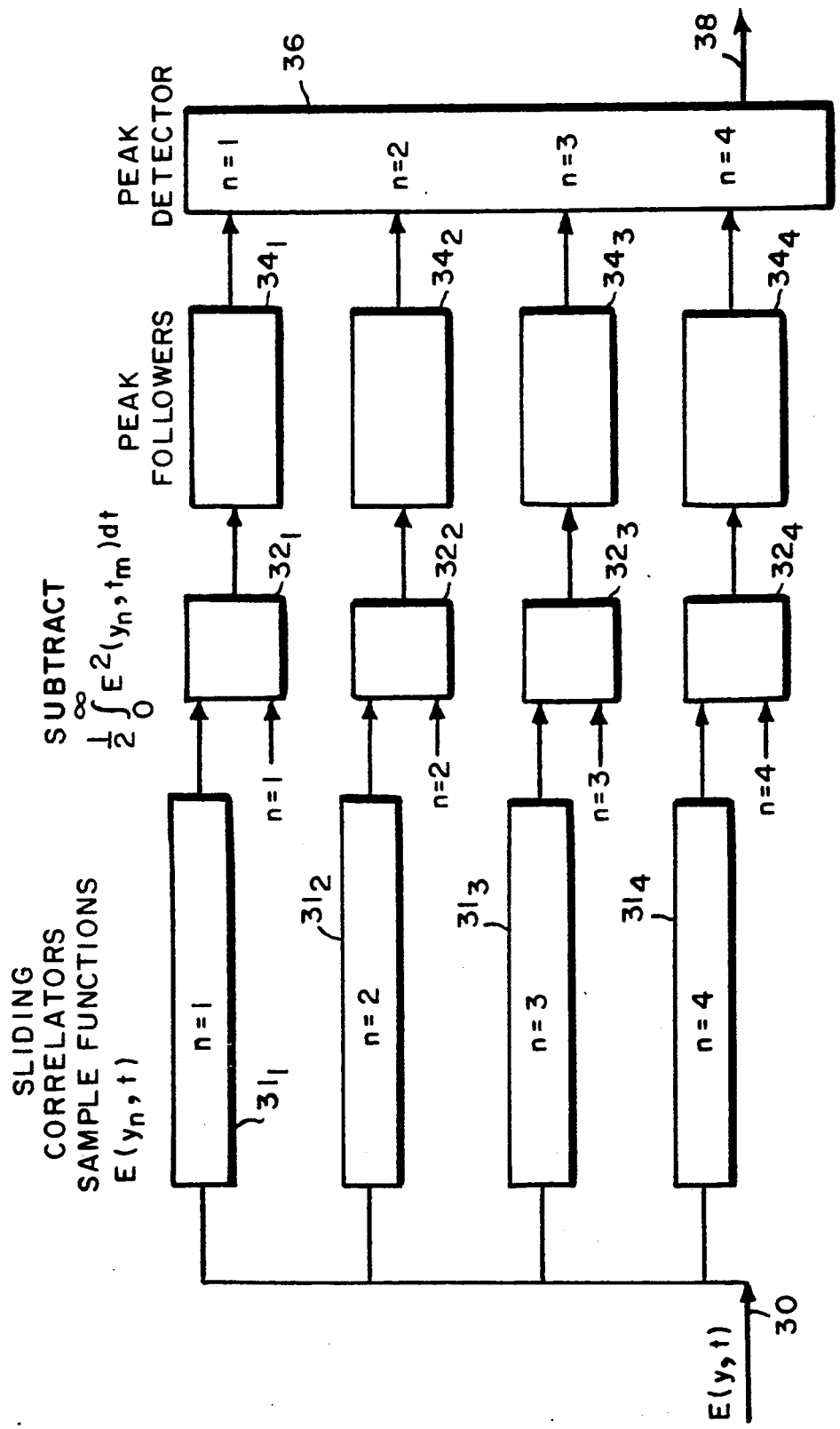
FIG. 4 is a block diagram showing a bank of sliding correlators that correlate a received signal $E(y,t)$ with sample signals computed for various possible distances to the target, or round-trip travel times t.

FIG. 4 is a block diagram of a circuit that illustrates the new principle as it relates to computed field strengths $E(y_n,t)$. The circuit of FIG. 4 compares a received field strength $E(y,t)$ with computed sample field strengths $E(y_n,t)$ for various distances $y_n$, to obtain the distance $y_n$, closest to the actually traveled distance y. It should be pointed out that generally the logic of this circuit would be implemented in software on a digital computer rather than in the custom hardware of FIG. 4, but the same logic would apply.

It is important to note that the received field strength $E(y,t)$ can either be sampled, digitized, and stored for a comparison with the sample functions $E(y_n,t)$ at a later time or handled in real time. There is no requirement to do this comparison in real time as there is with the classical threshold method. The information about the distance y propagated by the signal is contained in the shape of the waveform (i.e., its time variation) which can be stored. This is completely different from the usual measurement of range which must be made in real time.

Figure 5:
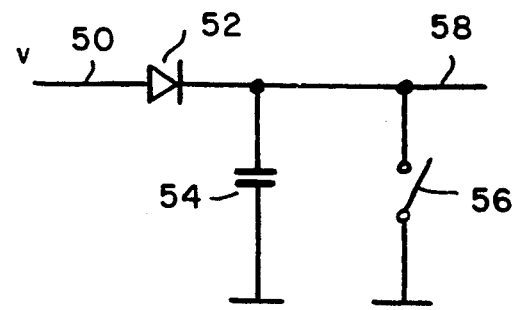
FIG. 5 is a simplified schematic circuit diagram of a peak voltage follower.

The received electric field strength $E(y,t)$, either as it is received or after sampling, digitizing, and perhaps storing, is fed into the circuit of FIG. 4 at point 30. From point 30, the received signal $E(y,t)$ is fed to sliding correlators $31_i$ that cross correlate it with previously computed functions $E(y_n,t)$ for values of $n=1, 2, 3$ and 4. The output of these sliding correlators is given by Eq. 4a for $n=1, 2, 3$ and 4, and $t'=0$, when the beginning of $E(y,t)$ and $E(y_n,t)$ coincide. When this particular time occurs is not of interest here, but this time can be determined by additional processing. The second integral in Eq. 3a, which has a constant value for each distance $y_n$ that can be computed ahead of time, is subtracted in subtractors $32_i$. The output of each subtractor $32_i$ is the function $$\int_o^\infty E(y,t)E(y_n,t)dt - 0.5 \int_o^\infty E^2(y_n,t)dt = F(t) \quad (5a)$$

for $n=i$. Peak followers $34_i$ take the respective outputs of subtractors $32_i$ and find the peak value of each circuit $32_i$. FIG. 5 shows a hardware peak follower that can be used for each $34_i$ circuit. Diode 52 and capacitor 54 combine to hold the peak voltage that appears at input 50 on capacitor 54 so that output 58 is the current peak value. If switch 56 is momentarily closed at the time $t=0$, the output voltage 58 at any time $t_{peak}>0$ will be equal to the largest value of input signal 50 in the time interval $0<t<t_{peak}$. In a digital processor the same result can be achieved by comparing a "stored number" with the "next arriving number." The larger of the two becomes the new "stored number." The process of comparison is continued for as long as cross-correlation functions of the received signal are produced.

At the end of the correlation period, peak followers $34_i$ in FIG. 4 contain the maximum values of Equation 5a for $n=1, 2, 3$ and 4. Block 36 of FIG. 5 is a multiple input peak detector. It determines which of the $n=1, 2$ ... peak values is largest. A typical method to do this in either hardware or in software involves comparing the output value of the peak followers for $n=1$ and $n=2$. Discarding the smaller value, then comparing the winner with the next, and so on. The output of block 36 is the value of n which produces the largest output from its peak follower $34_i$. The value of n for which the computed function yields the largest value, determines the distance $y_n$ closest to the actually propagated distance y of the received electric field strength $E(y,t)$.

Consider the case where FIG. 4 is used to determine the range of an object that is between 0 m and 800 m from the transceiver with a resolution of $\pm 50$ m. Eight functions $E(y_n,t)$ for $y_n = 50$ m, 150 m , . . . , 750 m, must be computed, and 8 correlators are required.

Any hardware or software implementation that is based on FIG. 4 requires that all the decisions be made in parallel with each other. However, using successive approximation will reduce the number of correlations required while trading off the time it takes to make the final decision. For instance, if the hardware correlators $31_i$ could be reconfigured for a different value of n, after each decision or if the processing is done in software, then the algorithm of FIG. 6 can be used. According to FIG. 6, only one type of circuit is required, but it is used in pairs. It contains blocks $31_i$, $32_i$ and $34_i$. Circuit $62_{200}$ is set for a distance of $y_n=200$m. Circuit $62_{600}$ for a distance of $y_n=600$ m. If the received signal $E(y,t)$ traveled a distance y in the range 500m$<$y$<$600m, then the voltage output from $62_{600}$ would be greater than the voltage output from $V_{200}$ since y is closer to 600 m than to 200 m. The hardware or software peak detector (not shown) would detect that voltage $V_{600}$ is greater than $V_{200}$ which would indicate that y is in the range 400 m$<$y$<$800. Next, the software (or hardware) correlators would be reset for 500m (i.e., block $62_{500}$) 700m (i.e., block $62_{700}$) and the stored signal $E(y,t)$ would be fed to circuits $62_{500}$ and $62_{700}$. The peak detector would now determine that $V_{500}>V_{700}$, indicating that 400m$>$y$>$600m. The correlators would subsequently be reset for 450m (i.e., block $62_{450}$) and 550m (i.e., block $62_{550}$) and the stored signal $E(y,t)$ would once again be fed to point 60. The peak detector would now determine that $V_{550}>V_{450}$, which indicates that 400m$<$y$<$500m.

Figure 6:
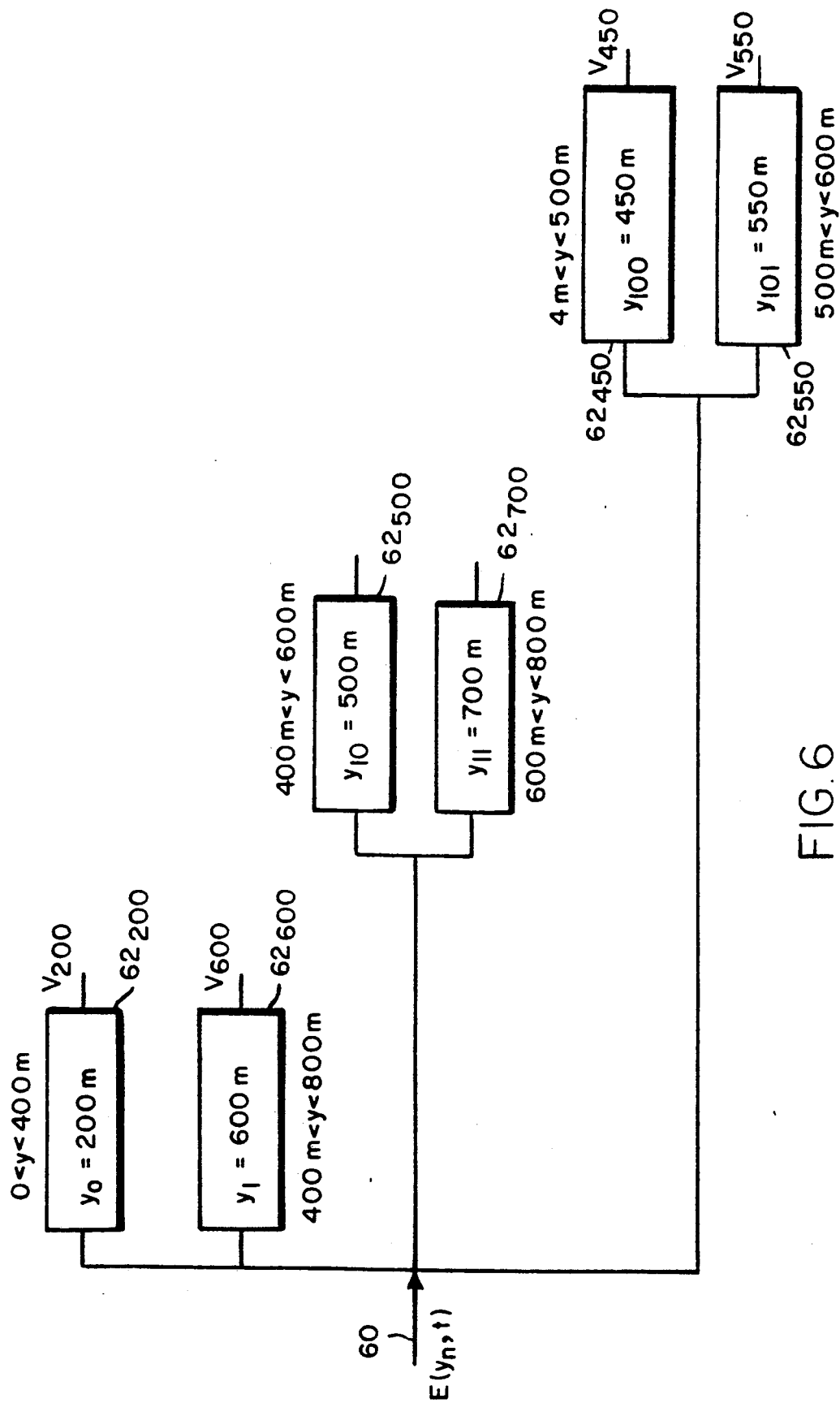
FIG. 6 is a block diagram for an apparatus permitting determination of the distance y or times t of an object with 2m correlations rather than $2^m$ correlations.

The successive approximation principle described in FIG. 6 requires 6 cross-correlation operations to discriminate between 8 range cells while the parallel decision principle of FIG. 4 requires 8 cross-correlations. This represents a small saving in this example. However, for 16, 32 , . . . , $2^m$ range cells, the apparatus of FIG. 6 requires 8, 10 , . . . , 2m correlations rather than the 16, 32 , . . . , $2^m$ correlations required in the apparatus of FIG. 4.

The method of FIG. 6 clearly requires that the received signal is stored and thus available on a repetitive basis.

Now consider the principle of precisely detecting the nominal arrival time of the return signal by computing time functions $E(\tau_n,t)$ and comparing them against the received field strength signal $E(\tau,t)$. The first integral of equation 3b is the cross correlation of the field strength signal at $t'=0$. That integral has its maximum when $\tau_n$ equals the nominal round-trip propagation time $\tau$ of the received signal.

The second integral can be obtained by computation of $E(\tau_n,t)$. The received field strength $E(\tau,t)$ can be compared in real-time, or sampled, digitized, and stored for a comparison with the computed functions $E(\tau_n,t)$ at a later time. This is different from the standard threshold method of detecting a received signal. First, it is not subject to the error described above and illustrated in FIG. 3. Second, the correlation can be done in either real time or off-line. It follows from Eqs. (2a) and (2b) that everything said for the distance y and the computed distances $y_n$ also holds for the nominal propagation time $\tau$ and the computed nominal propagation times $\tau_n$.

It follows from Eqs. (2a) and (2b) that everything said for the distance y and the computed distances $y_n$ also holds for the nominal propagation time $\tau$ and the computed nominal propagation times $\tau_n$.

Having thus described the basic concept of the invention, it will be readily apparent to those skilled in the art that the foregoing detailed disclosure is intended to be presented by way of example only, and is not limiting. Various alterations, improvements, and modifications will occur to those skilled in the art, though not expressly stated herein. These modifications, alterations, and improvements are intended to be suggested hereby, and are within the spirit and scope of the invention. Accordingly, the invention is limited only by the following claims and equivalents thereto:

What is claimed is:

1. A method for range determination in a lossy medium, comprising the steps of:

radiating an electromagnetic pulse into the lossy media;

receiving a distorted electromagnetic pulse returned from a target at a time in the medium;

determining the range of the target by comparing the received pulse to a plurality of distorted sample pulses each representing a different travel time through the medium.

2. The method of claim 1 wherein the step of determining includes the steps of:

determining the mean-square difference between the received pulse and each sample pulse;

selecting the sample pulse which yields the smallest mean-square-difference; and assigning as the time traveled by the received pulse, the time associated with the selected sample pulse.

3. The method of claim 1 wherein the step of determining includes the step of finding the maximum value of the function $$\int_0^\infty E(\tau,t)E(\tau_n,t)dt - .5 \int_0^\infty E(\tau_n,t)dt$$

for the received pulse of field strength $E(\tau,t)$, and the sample pulses of field strength $E(\tau_n,t)$, for a plurality of values of the variable $\tau_n$, representing times traveled in the media.

4. The method of claim 1 wherein the radiated electromagnetic pulse is not amplitude modulated onto a periodic sinusoidal wave.

5. The method of either claim 1 or claim 4 wherein the radiated electromagnetic pulse is a rectangular pulse.

6. The method of claim 1 wherein the distortion of the received electromagnetic pulse is substantially caused by the electromagnetic pulse traveling through the lossy medium.

7. The method of claim 1 wherein the step of determining includes the steps of:

finding a value of cross-correlation functions of the received pulse and each sample pulse; and selecting the sample pulse associated with the value of the function that is greater than a predetermined detection threshold.

8. The method of claim 7 wherein the step of selecting the sample pulse associated with the value above the detection threshold is followed by the step of assigning as the time traveled by the received pulse, the time associated with the selected sample pulse.

9. The method of claim 8 wherein the step of assigning the time traveled by the received pulse is followed by the step of associating the range of the target to one-half of the time traveled by the pulse.

10. The method of claim 1 wherein the step of determining the range is done in real-time as the return signal is being received.

11. The method of claim 1 wherein the step of determining the range includes the steps of:

recording the received pulse; and comparing the recorded pulses with the sample pulses at a time after the received pulse was received.

12. The method of any of claims 1–3 wherein the step of determining the range includes the step of computing the time variation of sample pulses for a plurality of distances through the medium.

* * * * *